US006899574B1

(12) United States Patent
Kalis et al.

(10) Patent No.: US 6,899,574 B1
(45) Date of Patent: May 31, 2005

(54) TRANSDUCER BRACKET

(75) Inventors: Robert M. Kalis, Overland Park, KS (US); Jeremy B. Hoppas, Olathe, KS (US); Craig L. Mehan, Overland Park, KS (US)

(73) Assignee: Garmin Ltd., (KY)

( * ) Notice: Subject to any disclaimer, the term of this patent is extended or adjusted under 35 U.S.C. 154(b) by 4 days.

(21) Appl. No.: 10/651,341

(22) Filed: Aug. 28, 2003

(51) Int. Cl.[7] .............................................. B60L 11/02
(52) U.S. Cl. .......................................... 440/6; 367/173
(58) Field of Search ........................... 440/6; 367/165, 367/173; 248/229.26

(56) References Cited

U.S. PATENT DOCUMENTS

| | | | | |
|---|---|---|---|---|
| 3,521,225 | A * | 7/1970 | Hansford et al. | 367/173 |
| 3,714,619 | A * | 1/1973 | Morgan et al. | 367/173 |
| 3,880,106 | A * | 4/1975 | Farmer | 367/165 |
| 3,907,239 | A * | 9/1975 | Ehrlich | 248/229.26 |
| 4,152,690 | A * | 5/1979 | Veatch | 367/173 |
| 4,456,210 | A | 6/1984 | McBride | 248/205.5 |
| 4,907,708 | A | 3/1990 | Csaszar | 215/252 |
| 4,926,399 | A * | 5/1990 | Hickman | 367/173 |
| 4,938,165 | A | 7/1990 | Williams et al. | 114/343 |
| 4,979,153 | A | 12/1990 | Terry | 367/93 |
| 4,982,924 | A | 1/1991 | Havins | 248/288.5 |
| 5,109,364 | A * | 4/1992 | Stiner | 367/165 |
| D329,615 | S | 9/1992 | Stiner | D10/46 |
| D329,616 | S | 9/1992 | Stiner | D10/46 |
| 5,525,081 | A | 6/1996 | Mardesich et al. | 440/6 |
| 5,697,319 | A | 12/1997 | Steensland et al. | 114/357 |
| 5,919,067 | A | 7/1999 | Smith | 440/2 |
| 6,160,764 | A | 12/2000 | Powell | 367/173 |
| 6,431,923 | B1 | 8/2002 | Knight et al. | 440/6 |
| 6,490,229 | B1 | 12/2002 | Caver | 367/173 |

* cited by examiner

*Primary Examiner*—Lars A. Olson
(74) *Attorney, Agent, or Firm*—Devon A. Rolf

(57) ABSTRACT

A universal transducer mounting bracket (10) that may be used to mount a transducer (12) to either a transom (14) or a trolling motor (16). A mounting body (18) broadly comprises a transom attachment (36) for mating to the transom (14), at least one hole (20) through the transom attachment (36) for accepting one or more fasteners therethrough in order to secure the bracket (10) to the transom (14), and an arcuate top wall (22) for mating to the trolling motor (16). The mounting body (18) preferably further includes two side walls (26) and a bottom wall (30) forming the transom attachment (36) for rigidly securing the bracket (10) to the transom (14). The transom attachment (36) may be defined by the walls (22,26,30,34) forming a perimeter around an opening, thereby making the bracket (10) hollow.

21 Claims, 2 Drawing Sheets

TRANSDUCER BRACKET

BACKGROUND OF THE INVENTION

1. Field of the Invention

The present invention relates to transducer mounting brackets. More particularly, the present invention relates to a universal transducer mounting bracket that may be used to mount a transducer to either a transom of a boat or a trolling motor.

2. Description of Prior Art

Fish finders or depth finders are commonly used by fishermen and other boaters to determine the depth of a body of water and/or the presence of underwater objects, such as fish, corral, etc. Fish finders and depth finders are often not installed in boats during manufacture, and therefore must be installed after purchase.

Fish finders and depth finders include a transducer, which must be secured to an outside portion of a boat. Transducers are commonly secured to either a boat's transom or trolling motor with a bracket. However, these two surfaces are significantly different, and therefore currently require two different brackets. Thus, users are required to decide where to mount transducers before purchase, in order to ensure that he or she gets a proper bracket. Likewise, some users like to alternate the mounting location of their transducers, and therefore must purchase two mounting brackets.

Accordingly, there is a need for an improved transducer mounting bracket that overcomes the limitations of the prior art.

SUMMARY OF THE INVENTION

The present invention overcomes the above-identified problems and provides a distinct advance in the art of transducer mounting brackets. More particularly, the present invention provides a universal transducer mounting bracket that may be used to mount a transducer to either a transom or a trolling motor of a boat. The preferred bracket broadly comprises a mounting body, which includes a transom attachment for mating to the transom and a trolling attachment for mating to the trolling motor; and a transducer attachment for mating to the transducer. In the preferred embodiment, the mounting body includes an arcuate top wall, two substantially vertical sidewalls extending downwardly from the top wall, and a bottom wall offset from the top wall.

The transom attachment is preferably not a solid planar surface, but is rather defined by the forward edges of the walls around an opening between the walls. In this manner, the mounting body is generally hollow. Such construction reduces the weight and cost of the bracket to and makes it easier to manufacture, as well as cheaper and easier to package and ship. Alternatively, the mounting body may include a substantially solid planar front wall which defines the transom attachment.

The mounting body also preferably includes interior dividers defining at least one oblong hole therethrough for accepting one or more fasteners in order to secure the bracket to the transom. Since the hole is oblong, a height of the transducer may be adjusted without additional drilling. For example, the fastener may be loosened and the mounting body may be moved up or down relative to the fastener. A reduced diameter shelf is positioned inside each hole near the transom attachment. The hole behind the shelf is wider than a head of the fastener, thereby allowing the head to pass therethrough. The shelf narrows the hole, so that the hole is at least as wide as a shaft of the fastener, but significantly narrower than the head of the fastener. In this manner, the fastener may be countersunk, such that the head is within and protected by the mounting body itself.

The top wall is preferably defined by a radius of curvature designed to conform to the trolling motor, and therefore serves as the trolling attachment. The top wall of the bracket is preferably secured to the trolling motor using a cable tie, band clamp, or some other device utilizing a band. In this regard, the mounting body preferably includes two substantially rectangular slots, one in each of the side walls near and extending along the top wall, and an arcuate interior partition. The partition is preferably substantially parallel to the top wall and slightly offset therefrom. Constructed in this manner, the partition is operable to guide the band between the slots. Together, the slots and the partition allow the band to be wrapped around the trolling motor and through the mounting body in order to secure the bracket to the trolling motor.

In order to prevent the mounting body from rotating about the trolling motor, the top wall may include a plurality of ribs, indentions, or other protrusions. A resilient pad made of a flexible material may be placed between the top wall and the trolling motor in order to further increase friction between the top wall and the trolling motor. The pad may also be used to accommodate trolling motors of different dimensions. For example, if a larger trolling motor is used with the bracket, the pad may be significantly compressed near edges of the top wall and relatively uncompressed near the top wall's center. Likewise, if a smaller trolling motor is used, the pad may be significantly compressed near the top wall's center and relatively uncompressed near the edges of the top wall. Furthermore, the pad may be placed between the transom attachment and the transom. In this case, the pad substantially forms a seal between the mounting body and the transom, thereby preventing water from entering the opening of the mounting body.

In the preferred embodiment, the transducer attachment includes two transducer mounting shelfs. Each shelf preferably extends downwardly from and substantially perpendicular to the bottom wall of the mounting body. Each shelf preferably includes a mounting hole surrounded by a plurality of transducer orientation teeth. The mounting holes receive a bolt, or other threaded fastener, in order to secure the transducer to the transducer attachment. The teeth are substantially centered on the corresponding mounting hole and arranged radially thereon. The teeth allow the transducer to be secured at any one of a plurality of angles with respect to the mounting body.

A channel may be formed between the top and bottom walls of the mounting body for guiding a transducer cable from between the shelfs to above the bracket. The channel preferably extends through the bottom wall between the shelfs to a front or rear edge of the top wall. In this manner, the bracket accommodates the cable while preventing the cable from interfering with adjustment of the angle between the transducer and the bracket.

In use, a user decides whether to mount the transducer to the transom of a boat or the trolling motor. If the user decides to mount the transducer to the transom, the user holds the transducer attachment of the mounting body against the transom and marks a drilling point through the holes. The user then drills into the transom through the marks. Finally, the user aligns the bracket with the drilled holes and drives the fasteners through the holes and into the transom.

The transducer is then mounted to the transducer attachment by securing a bolt through the transducer attachment and the transducer. The user may adjust the height of the transducer by simply loosening the fasteners, sliding the bracket up or down, and then tightening the fasteners. The angle between the transducer and the boat may also be adjusted by loosening the bolt and rotating the transducer.

Alternatively, if the user decides to mount the transducer to the trolling motor, the user slides the band through the slots. Then, the user holds the top wall of the mounting body against the trolling motor, wraps the band through the slots and around the trolling motor, and secures the band. At this point, the transducer may be mounted to the transducer attachment and the angle may be adjusted, as discussed above.

It can be seen that the bracket of the present invention allows the transducer to be mounted to either the transom or the trolling motor. Thus, only the bracket of the present invention need be packaged and sold with the transducer, thereby simplifying packaging and marketing challenges. For example, packages need not be individually labeled to indicate that they include a transom bracket or a trolling motor bracket.

BRIEF DESCRIPTION OF THE DRAWINGS

A preferred embodiment of the present invention is described in detail below with reference to the attached drawing figures, wherein.

DETAILED DESCRIPTION OF A PREFERRED EMBODIMENT

Figure 1:
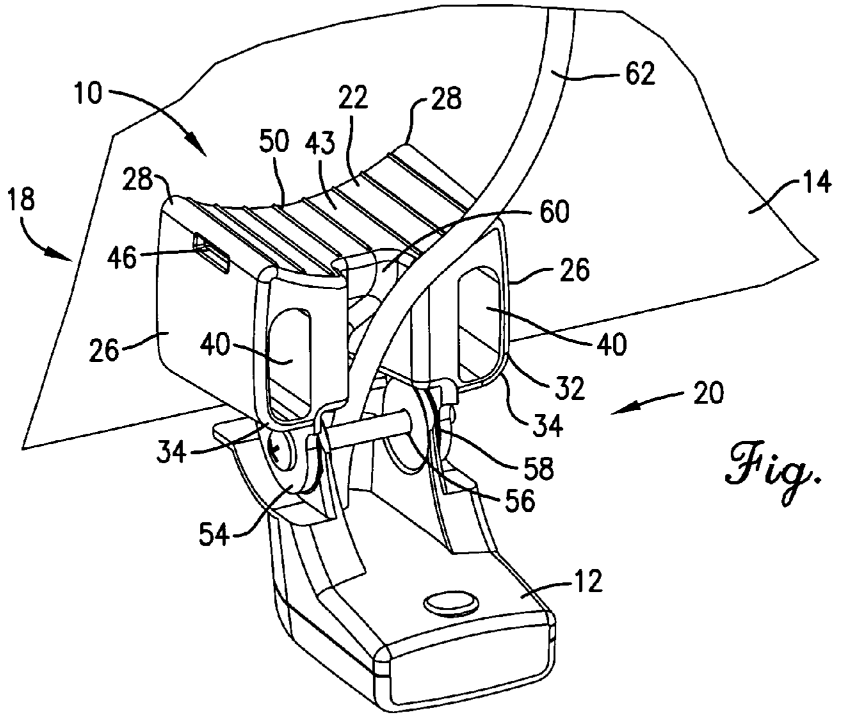
FIG. 1 is a perspective view of a transducer mounting bracket constructed in accordance with a preferred embodiment of the present invention and shown between a transducer and a transom of a boat.
Figure 2:
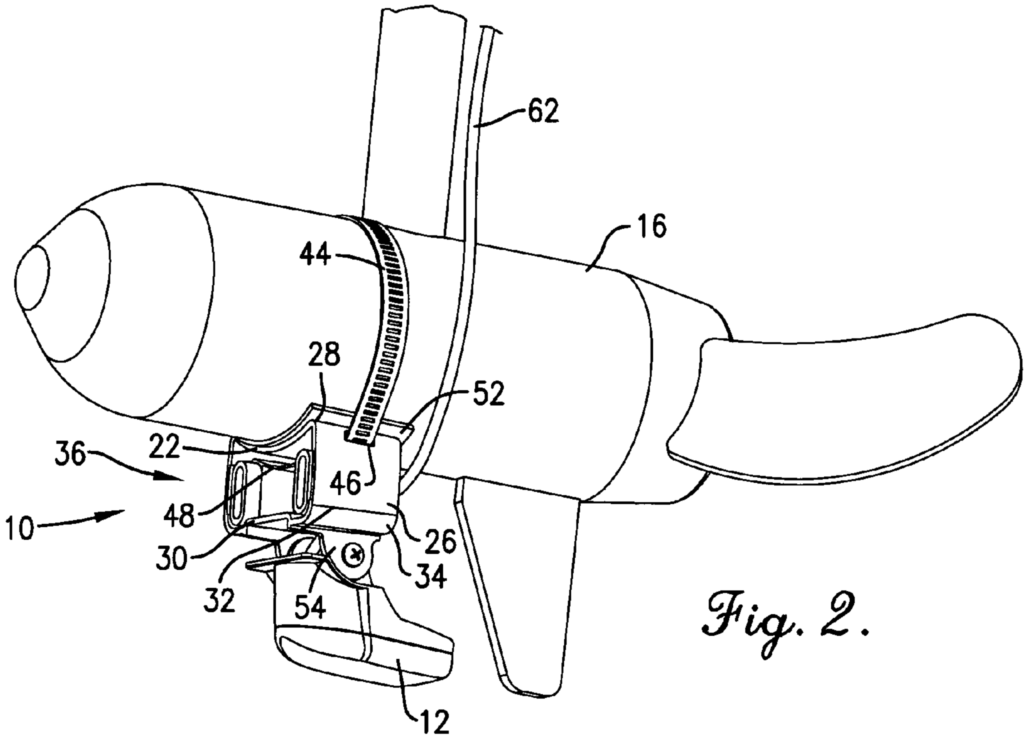
FIG. 2 is a perspective view of the bracket shown between the transducer and a trolling motor.
Figure 5:
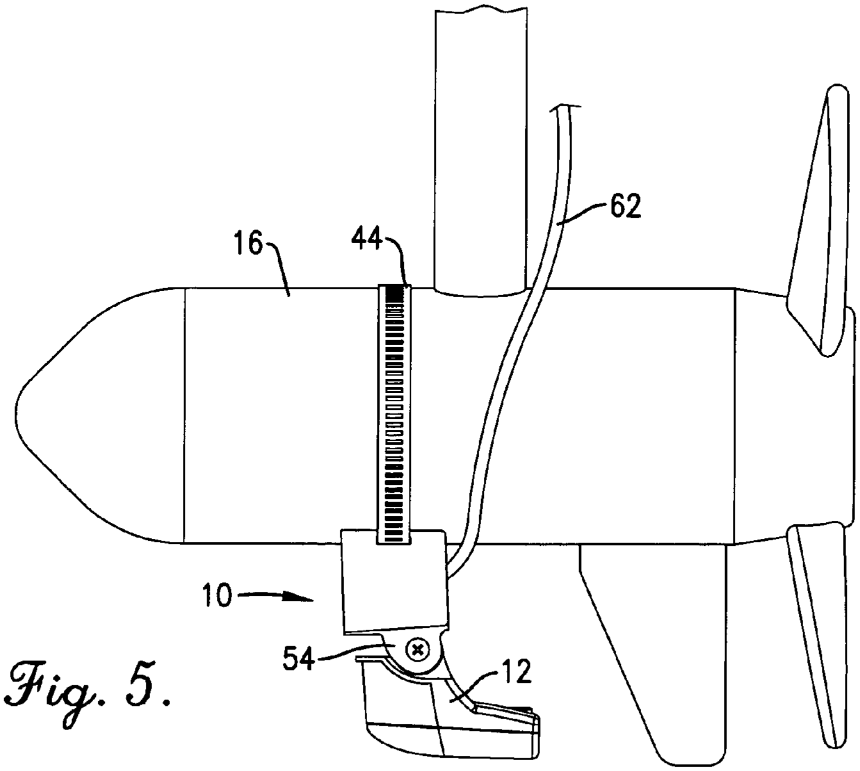
FIG. 5 is a side elevation view of the bracket shown between the transducer and the trolling motor.

Referring to the figures, and particularly FIGS. 1 and 2, the preferred universal transducer mounting bracket 10 constructed in accordance with a preferred embodiment of the present invention is illustrated securing an ultrasonic transducer 12 to a transom 14 of a boat or a tolling motor 16. The bracket 10 broadly comprises a mounting body 18, which includes a transom attachment for mating to the transom 14 and a trolling attachment for mating to the trolling motor 16; and a transducer attachment 20 for mating to the transducer 12.

In the preferred embodiment, the mounting body 18 includes an arcuate top wall 22, two substantially vertical side walls 26 adjacent opposing edges 28 of the top wall 22 and extending downward therefrom, a substantially horizontal bottom wall 30 offset from the top wall 22 and disposed substantially midway between opposing bottom edges 32 of the side walls 26, and two transition walls 34 connecting the side walls 26 to the bottom wall 30. The bracket 10 is preferably constructed of plastic or another material that may be molded or formed into complex shapes.

Forward edges of the walls 22,26,30,34 preferably define the transom mounting attachment 36. The transom attachment 36 is approximately sixty-two millimeters by approximately forty-three millimeters and is preferably not a solid planar surface, as shown. Rather, the transom attachment 36 is preferably defined by the forward edges of the walls 22,26,30,34 around an opening between the walls 22,26,30, 34. In this manner, the mounting body 18 is generally hollow. Such construction reduces the weight and cost of the bracket 10 and makes the bracket 20 easier to manufacture, as well as cheaper and easier to package and ship. Alternatively, the mounting body 18 may include a substantially solid planar front wall which defines the transom attachment 36. In any case, the walls 22,26,30,34 must be strong enough to withstand the forces exerted upon them. In this regard, it has been determined that the walls 22,26,30,34 are preferably approximately two and one half millimeters thick, but may be between one and ten millimeters thick. Of course, use of a stronger or weaker material may modify the requirements of the walls 22,26,30,34.

Figure 3:
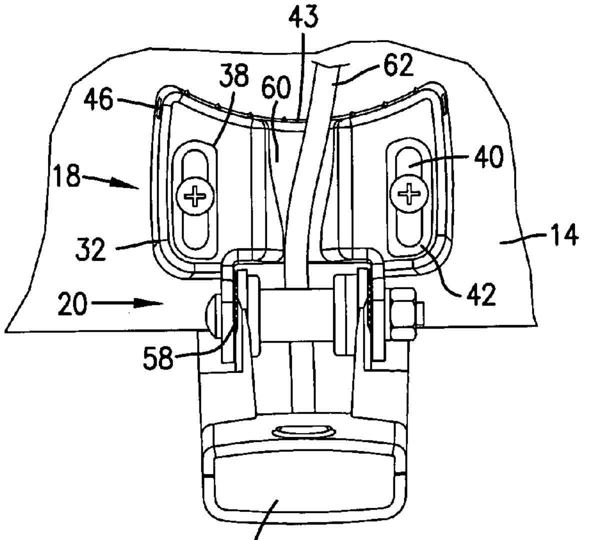
FIG. 3 is a rear elevation view of the bracket shown between the transducer and the transom.
Figure 4:
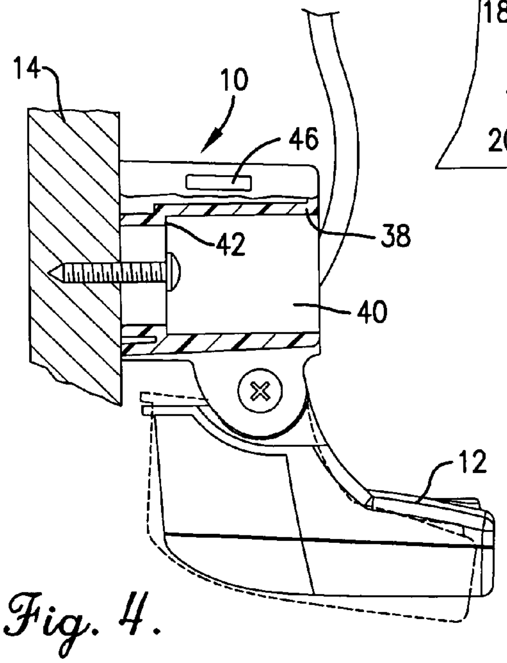
FIG. 4 is a side sectional view of the bracket shown between the transducer and the transom.

Referring also to FIGS. 3 and 4, the mounting body 18 also preferably includes interior dividers 38 defining at least one oblong hole 40 for accepting one or more fasteners therethrough in order to secure the bracket 10 to the transom 14. Since the hole 40 is oblong, a height of the transducer 12 may be adjusted without additional drilling into either the mounting body 18 or the transom 14. For example, the fastener may be loosened and the mounting body 18 may be moved relative to the fastener without completely removing the fastener.

A reduced diameter shelf 42 is preferably positioned inside each hole 40 near the transom attachment 36. The hole 40 behind the shelf 42 is preferably wider than a head of the fastener, thereby allowing the head to pass therethrough allowing the fastener to be countersunk, such that the head is within and protected by the mounting body 18 itself. In the preferred embodiment, this wide portion of the hole 40 is approximately nine and one half millimeters wide and twenty-five and one half millimeters long. The shelf 42 narrows the hole 40 so that the hole 40 is at least as wide as a shaft of the fastener, but significantly narrower than the head of the fastener. In the preferred embodiment, this narrow portion of the hole is approximately five millimeters wide and approximately twenty-one millimeters long. The shelf 42 is preferably offset from the transom attachment 36 by approximately ten millimeters, such that the wide portion is approximately thirty-three millimeters deep.

The top wall 22 is preferably approximately sixty-two millimeters by approximately forty-three millimeters. The top wall 22 may be defined by an approximately fifty millimeter radius of curvature in order to conform to the trolling motor 16, which is expected to have an approximately one hundred millimeter diameter, and therefore serves as the trolling attachment. The top wall 22 is preferably concave and forms a portion of a cylinder such that the top wall 22 conforms to the tolling motor 16 with the tolling motor 16 being closest to the transducer 12 near a center 43 of the top wall 22. It is important to note that the top wall 22 may be designed for different tolling motors, and therefore may have a larger or smaller radius of curvature. However, with currently available trolling motors 24, the top wall's 22 radius of curvature is expected to be between twenty five and seventy-five millimeters.

The top wall 22 of the bracket 10 is preferably secured to the trolling motor 16 using a cable tie, band clamp, or some other device utilizing a band 44. In this regard, the mounting body 18 preferably includes two substantially rectangular slots 46, one in each of the side walls 26 near and extending along the top wall 22. Each slot 46 is preferably approximately three millimeters tall and approximately fourteen millimeters long. Together, the slots 46 allow the band 44 to be wrapped around the trolling motor 16 and through the mounting body 18 in order to secure the bracket 10 to the trolling motor 16.

To further aid in securing the bracket 10 to the trolling motor 16, the mounting body 18 may include an arcuate interior partition 48. The partition 48 is preferably substantially parallel to the top wall 22 and slightly offset therefrom. In the preferred embodiment, the partition 48 is preferably between one and two millimeters thick and offset from the top wall 22 by approximately five millimeters. Constructed in this manner, the partition 48 is operable to guide the band 44 between the slots 46.

In order to prevent the mounting body 18 from rotating about the trolling motor 16, the top wall 22 may include a plurality of ribs 50, indentations or other protrusions. The ribs 50 are preferably linear and run along the top wall 22. The preferred embodiment includes eight ribs 50, with each rib 50 having a triangular cross-section and rising above the top wall 22 between one half and one millimeter.

A resilient pad 52 made of a flexible material, such as rubber, may be placed between the top wall 22 and the trolling motor 16. The pad 52 conforms to the trolling motor 16 and further increases friction between the top wall 22 and the trolling motor 16, in order to rigidly secure the bracket 10 to the trolling motor 16. In the preferred embodiment, the pad 52 is approximately seventy millimeters wide, approximately fifty millimeters tall, and approximately five millimeters thick.

The pad 52 may also be placed between the transom attachment 36 and the transom 14. In this case, the pad 52 substantially forms a seal between the mounting body 18 and the transom 14, thereby preventing water from entering the opening of the mounting body 18.

Additionally, the pad 52 may be used to accommodate trolling motors of different dimensions. For example, if a larger trolling motor is used with the bracket 10, the pad 52 may be significantly compressed near the edges 28 of the top wall 22 and relatively uncompressed near the center 43 of the top wall 22. In this manner, the pad 52 allows the bracket 10 to conform to the larger trolling motor. Likewise, if a smaller trolling motor is used, the pad 52 may be significantly compressed near the center 43 of the top wall 22 and relatively uncompressed near the edges 28 of the top wall 22. In this manner, the pad 52 allows the bracket 10 to conform to the smaller trolling motor.

In the preferred embodiment, the transducer attachment 20 includes two transducer mounting shelfs 54. Each shelf 54 preferably extends downward from and substantially perpendicular to the bottom wall 30 of the mounting body 18, where the bottom wall 30 meets each of the transition walls 34. Each shelf 54 preferably includes a mounting hole 56 surrounded by a plurality of transducer orientation teeth 58. The mounting hole 56 is preferably aligned substantially parallel to the bottom wall 30 and substantially perpendicular to the side walls 26 and receives a bolt, or other threaded fastener, in order to secure the transducer 12 to the bracket 10. The mounting holes 56 are preferably approximately seven millimeters below a bottom edge of the transom attachment 36 and measure approximately five and one half millimeters in diameter. The teeth 58 are substantially centered on the corresponding mounting hole 56 and arranged radially thereon having an external diameter of approximately nineteen millimeters and an internal diameter of approximately fourteen millimeters. The teeth 58 allow the transducer 12 to be secured at any one of a plurality of angles with respect to the bracket 10.

In any case, it is important to note that the transducer attachment 20 is designed to mate with the transducer 12 and may be significantly different from that described above in order to accommodate the transducer 12. For example, the transducer attachment 20 may simply comprise a threaded hole in the bottom wall 30, where the transducer is designed to mate using a substantially vertical threaded fastener.

A channel 60 may be formed between the top and bottom walls 22,30 for guiding a transducer cable 62 from between the shelfs 54 to above the bracket 10. The channel 60 is preferably at least seven millimeters wide and preferably extends through the bottom wall 30 between the shelfs 54 to a front or rear edge of the top wall 22. In this manner, the bracket 10 accommodates the cable 62 while preventing the cable 62 from interfering with adjustment of the angle between the transducer 12 and the bracket 10.

While the present invention has been described above, it is understood that substitutions may be made. For example, while the walls 22,26,30,34 have been described above as substantially perpendicular to each other and the transom attachment 36, other angles may be used. The walls 22,26, 30,34 may even be rounded such that no individual angle is definable. The bracket 10 may also be unitary, such that the mounting body 18 and the transducer attachment 20 are integrally formed and continuous. These and other minor modifications are within the scope of the present invention.

Having thus described a preferred embodiment of the invention, what is claimed as new and desired to be protected by Letters Patent includes the following:

1. A universal bracket for mounting an ultrasonic transducer to a boat transom or trolling motor, the bracket comprising:

a mounting body including a transom attachment for mating to the transom, and a trolling attachment for mating to the trolling motor; and a transducer attachment for mating to the transducer.

2. The bracket as set forth in claim 1, wherein the mounting body further includes a divider defining an oblong hole through the transom attachment for accepting a fastener therethrough in order to secure the bracket to the transom such that the bracket may be moved relative to the fastener.

3. The bracket as set forth in claim 1, wherein the trolling attachment comprises a top wall aligned substantially perpendicular to the transom attachment.

4. The bracket as set forth in claim 3, wherein the top wall includes ribs operable to prevent the bracket from rotating about the trolling motor.

5. The bracket as set forth in claim 3, wherein the mounting body further includes two slots each adjacent opposing edges of the top wall and operable to accept a band therethrough in order to secure the bracket to the trolling motor.

6. The bracket as set forth in claim 5, wherein the mounting body further includes an arcuate interior partition substantially parallel to the top wall, slightly offset from the top wall, and operable to guide the band between the slots.

7. The bracket as set forth in claim 3, further including a resilient pad operable to fit between the top wall and the trolling motor.

8. The bracket as set forth in claim 3, wherein the mounting body further includes a first substantially vertical side wall adjacent a first edge of the top wall and extending downward therefrom, a second substantially vertical side wall adjacent a second edge of the top wall and extending downward therefrom, a substantially horizontal bottom wall offset from the top wall and disposed substantially midway between opposing bottom edges of the side walls, a first transition wall connecting the first side wall to the bottom wall, and a second transition wall connecting the second side wall to the bottom wall.

9. The bracket as set forth in claim 8, wherein the transducer attachment includes two transducer mounting shelfs extending substantially perpendicular to the bottom wall, having a plurality of teeth, and operable to secure the transducer at any one of a plurality of orientations with respect to the mounting body.

10. A universal bracket for mounting an ultrasonic transducer to a boat transom or trolling motor, the bracket comprising:

a mounting body including a substantially arcuate top wall for mating to the trolling motor, two slots each slot adjacent opposing edges of the top wall and operable to accept a band therethrough in order to secure the bracket to the trolling motor, a transom attachment aligned substantially perpendicular to the top wall for mating to the transom, and two dividers each defining one of two holes through the transom attachment with each hole operable to accept a fastener therethrough in order to secure the bracket to the transom; and a transducer attachment for mating to the transducer.

11. The bracket as set forth in claim 10, wherein the top wall has a radius of curvature of approximately fifty millimeters.

12. The bracket as set forth in claim 10, wherein the top wall includes ribs operable to prevent the bracket from rotating about the trolling motor.

13. The bracket as set forth in claim 10, further including an arcuate interior partition substantially parallel to the top wall and slightly offset therefrom and operable to guide the band between the slots.

14. The bracket as set forth in claim 10, wherein each hole is oblong such that the bracket may be moved relative to the fastener without removing the fastener.

15. The bracket as set forth in claim 10, wherein the top wall is concave and forms a portion of a cylinder such that the top wall conforms to the tolling motor with the tolling motor being closest to the transducer near a center of the top wall.

16. The bracket as set forth in claim 10, further including a resilient pad operable to fit between the top wall and the trolling motor in order to accommodate trolling motors of differing sizes.

17. The bracket as set forth in claim 16, wherein the pad is further operable to fit between the transom attachment and the transom in order to substantially seal the mounting body such that water is prevented from entering the mounting body.

18. The bracket as set forth in claim 10, further including a first substantially vertical side wall adjacent a first edge of the top wall and extending downward therefrom, a second substantially vertical side wall adjacent a second edge of the top wall and extending downward therefrom, a substantially horizontal bottom wall offset from the top wall and disposed substantially midway between opposing bottom edges of the side walls, a first transition wall connecting the first side wall to the bottom wall, and a second transition wall connecting the second side wall to the bottom wall.

19. The bracket as set forth in claim 18, wherein the transducer attachment includes a transducer mounting shelf extending substantially perpendicular to the bottom wall, having a plurality of teeth, and operable to secure the transducer at any one of a plurality of orientations with respect to the bracket.

20. A universal bracket for mounting an ultrasonic transducer to a boat transom or a trolling motor, the bracket comprising:

a substantially arcuate top wall having an approximately fifty millimeter radius of curvature for mating to the trolling motor;

a first substantially vertical side wall adjacent a first edge of the top wall and extending downward therefrom;

a first substantially rectangular slot in the first side wall near the first edge of and extending along the top wall;

a second substantially vertical side wall adjacent a second edge of the top wall and extending downward therefrom;

a second substantially rectangular slot in the second side wall near the second edge of and extending along the top wall, together with the first slot operable to accept a band therethrough in order to secure the bracket to the trolling motor;

an arcuate interior partition substantially parallel to the top wall, slightly offset therefrom, and operable to guide the band between the slots;

a plurality of ribs running along the top wall and operable to prevent the bracket from rotating about the trolling motor;

a substantially horizontal bottom wall offset from the top wall and disposed substantially midway between opposing bottom edges of the side walls;

a first transition wall connecting the first side wall to the bottom wall;

a second transition wall connecting the second side wall to the bottom wall;

wherein the walls are less than five millimeters thick and terminate in a planar transom attachment aligned substantially perpendicular to the walls for mating to the transom, such that the bracket is substantially hollow with an opening defined between the walls;

a first substantially oblong hole through the transom attachment operable to accept a first fastener therethrough in order to secure the bracket to the transom such that the bracket may be moved relative to the fastener without removing the fastener;

a second substantially oblong hole through the transom attachment operable to accept a second fastener therethrough in order to secure the bracket to the transom such that the bracket may be moved relative to the fastener without removing the fastener;

a resilient pad operable to fit between the bracket and the trolling motor along the top wall in order to accommodate trolling motors of differing sizes;

wherein the pad is further operable to fit between the transom attachment and the transom in order to substantially seal the opening, such that water is prevented from entering the bracket;

a first transducer mounting shelf extending from where the bottom wall meets the first transition substantially perpendicular to the bottom wall and including a first plurality of teeth arranged around a first penetration aligned substantially parallel to the bottom wall and substantially perpendicular to the side walls;

a second transducer mounting shelf extending from where the bottom wall meets the second transition substantially perpendicular to the bottom wall and including a second plurality of teeth arranged around a second penetration aligned substantially parallel to the bottom wall and substantially perpendicular to the side walls, together with the first shelf operable to secure the transducer at any one of a plurality of orientations with respect to the bracket; and a channel for guiding a cable of the transducer between the shelfs.

21. A universal bracket for mounting an ultrasonic transducer to a boat transom or trolling motor, the bracket comprising:

a mounting body including a transom attachment for mating to the transom, and a trolling attachment for mating to the trolling motor, the trolling motor attachment comprising an arcuate top wall; and a transducer attachment for mating to the transducer.

* * * * *